(12) United States Patent
Asada et al.

(10) Patent No.: US 7,373,919 B2
(45) Date of Patent: May 20, 2008

(54) ELECTRIC POWER GENERATION CONTROL SYSTEM

(75) Inventors: Tadatoshi Asada, Anjo (JP); Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/716,562

(22) Filed: Mar. 12, 2007

(65) Prior Publication Data

US 2007/0227499 A1 Oct. 4, 2007

(30) Foreign Application Priority Data

Apr. 4, 2006 (JP) .............................. 2006-102725

(51) Int. Cl.
*F02D 41/16* (2006.01)
(52) U.S. Cl. ................................. 123/339.18
(58) Field of Classification Search .......... 123/339.16, 123/339.18
See application file for complete search history.

(56) References Cited

U.S. PATENT DOCUMENTS

| | | | | |
|---|---|---|---|---|
| 4,520,272 A | * | 5/1985 | Danno et al. .......... | 123/339.18 |
| 4,629,968 A | * | 12/1986 | Butts et al. ................ | 322/29 |
| 5,111,788 A | * | 5/1992 | Washino ................ | 123/339.11 |
| 5,270,575 A | * | 12/1993 | Togai et al. .............. | 290/40 C |
| 5,352,971 A | * | 10/1994 | Nishimura .................. | 322/27 |
| 5,467,008 A | * | 11/1995 | Uchinami .................... | 322/27 |
| 5,712,786 A | * | 1/1998 | Ueda ...................... | 123/339.18 |
| 6,109,237 A | * | 8/2000 | Pels et al. .............. | 123/339.19 |
| 7,036,484 B2 | * | 5/2006 | Mathews et al. ...... | 123/339.11 |
| 2004/0102892 A1 | * | 5/2004 | Aldrich et al. ......... | 123/339.18 |

FOREIGN PATENT DOCUMENTS

| | | |
|---|---|---|
| JP | A 5-227675 | 9/1993 |
| JP | A 5-268733 | 10/1993 |
| JP | A 8-140284 | 5/1996 |

\* cited by examiner

*Primary Examiner*—Erick Solis
(74) *Attorney, Agent, or Firm*—Oliff & Berridge, PLC

(57) ABSTRACT

An electric power generation control system has an electric power generation amount determining section for determining an electric power generation request amount of a vehicle alternator by monitoring vehicle conditions, an electric power generation amount increase judgment section for judging presence/absence of an electric power generation amount increase request to the vehicle alternator based on change of the electric power generation request amount in passage of time, an idle state judgment section for judging whether or not a vehicle engine falls in idle operation state, and an electric power generation amount suppressing control section for suppressing an electric power generation amount of the vehicle alternator. In the idle operation state of the vehicle engine and the presence of the electric power generation amount increase request, the electric power generation amount suppressing control section halts the control of suppressing the electric power generation of the vehicle alternator.

15 Claims, 10 Drawing Sheets

ELECTRIC POWER GENERATION CONTROL SYSTEM

CROSS-REFERENCE TO RELATED APPLICATION

This application is related to and claims priority from Japanese Patent Application No. 2006-102725 filed on Apr. 4, 2006, the contents of which are hereby incorporated by reference.

BACKGROUND OF THE INVENTION

1. Field of the Invention

The present invention relates to an electric power generation control system capable of controlling the electric power generation state of a vehicular A.C. generator (a vehicle alternator), which is driven by a vehicle engine (an internal combustion engine), for supplying electric power to a battery and electric loads mounted on a vehicle.

2. Description of the Related Art

An electric power generation control apparatus has been well known, which is capable of suppressing the amount of current of the electric power generation of a vehicle alternator when all cylinders of a vehicle engine (or an internal combustion engine) fall in deactivated operation state during its idle state. Japanese patent laid open publication No. JP-H5-227675 has disclosed such a related-art technique (see pages 2-3, and FIGS. 1-4).

There is another electric power generation control apparatus of a well-known related-art technique disclosed in Japanese patent laid open publication No. JP-H8-140284, that is capable of slowly increasing the exciting current of a vehicle alternator so as to suppress the change ratio of a rotation speed of the vehicle alternator and capable of increasing the change ratio of the exciting current when detecting the activation of electric loads mounted on a vehicle.

However, the technique disclosed in the former related art JP-H5-227675 involves a drawback of greatly decreasing the output voltage of the electric power generation of the vehicle alternator when the electric loads are turned on in the idle state of the vehicle engine because the current of the electric power generation of the vehicle alternator is limited when all cylinders of the vehicle engine fall in deactivated operation state under the idle state of the vehicle engine. Further, the technique disclosed in the latter related art JP-H8-140284 involves a drawback of having a low response speed because it takes a relatively long time until the output voltage of the electric power generation reaches a specified voltage level according to increasing an actual exciting current although the increasing speed of the exciting current becomes large when detecting the turned-on or the activation of the electric loads.

SUMMARY OF THE INVENTION

It is an object of the present invention to provide an electric power generation control system capable of stabilizing the rotation speed of a vehicle engine during its idle state, capable of preventing a voltage drop of the output voltage of electric power generation of a vehicle alternator when electric loads are turned on, namely, activated, and capable of increasing a response speed of the output voltage of the electric power generation.

To achieve the above purposes, the present invention provides an electric power generation control system has an electric power generation amount determining means, an electric power generation increase amount judgment means, an idle state judgment means, and an electric power generation amount suppressing control means. The electric power generation amount determining means is configured to determine an electric power generation request amount of a vehicle alternator while monitoring vehicle conditions. The electric power generation increase amount judgment means is configured to judge presence and absence of an electric power generation amount increase request for the vehicle alternator based on a change of the electric power generation request amount over the passage of time. The idle state judgment means is configured to judge whether or not a vehicle engine falls in idle operation state. The electric power generation amount suppressing control means is configured to control suppression of the electric power generation amount of the vehicle alternator. In the electric power generation control system, the electric power generation amount suppressing control means halts the execution of the electric power generation amount suppressing control when the judgment result of the idle state judgment means indicates that the vehicle engine falls in the idle operation state, and the judgment result of the electric power generation increase amount judgment means indicates the presence of the electric power generation increase amount request.

Because it is possible to halt the control of suppressing the amount of the electric power generation and to return the current control to the control of not suppressing the amount of the electric power generation when the request to increase the electric power generation occurs during the idle operation state of the vehicle engine, it is possible to maintain the desired amount of the electric power generation rapidly, and to prevent the voltage drop caused by turning on the electric loads. Further, because the vehicle conditions are always monitored, it is possible to perform quick response to the request to increase the amount of the electric power generation of the vehicle alternator.

According to another aspect of the present invention, it is preferred that the electric power generation amount suppressing control means in the electric power generation control system described above halts the control of suppressing the electric power generation amount when the judgment result of the idle state judgment means indicates that the vehicle engine does not fall in the idle operation state. It is thereby possible to suppress the voltage fluctuation of the vehicle alternator to the minimum value because the control of suppressing the electric power generation is halted while the vehicle engine does not fall in the idle operation state.

According to another aspect of the present invention, it is preferred that the electric power generation amount suppressing control means in the electric power generation control system described above performs the control of suppressing the electric power generation amount when the judgment result of the idle state judgment means indicates that the vehicle engine falls in the idle operation state, and the judgment result of the electric power generation increase amount judgment means indicates the absence of the electric power generation increase amount request. It is thereby possible to suppress the fluctuation of and to stabilize the rotation speed of the rotation speed of the vehicle engine because the electric power generation amount us suppressed when there is no request to increase the electric power generation amount during the idle operation state of the vehicle engine.

According to another aspect of the present invention, it is preferred that the electric power generation control system described above further has an external control device placed apart from the vehicle alternator, and an electric power generation control device placed near the vehicle alternator. In the electric power generation control system, the external control device has the idle state judgment means and the electric power generation increase amount judgment means. The electric power generation control device has the electric power generation amount suppressing control means, and the external control device transfers the judgment result obtained by the electric power generation increase amount judgment means to the electric power generation control device through a communication line.

It is thereby possible to reduce various types of stresses such as thermal stress and vibration applied to the external control device because the external control device can be placed apart from the vehicle alternator and thereby placed apart from the vehicle engine on which the vehicle alternator is mounted. Further, because this configuration does not require thermal-resistance measure for electric parts which form the external control device, it is possible to reduce the manufacturing cost of the system and also to increase the reliability of the entire system. Still further, because the above configuration can eliminate the occurrence of a voltage drop on connection lines and the introduction of noises, it is possible to increase the reliability of the electric power generation control performed by the electric power generation control system.

According to another aspect of the present invention, it is preferred that the electric power generation control system described above further has an external control device which is placed apart from the vehicle alternator, and an electric power generation control device which is placed near the vehicle alternator. It is further preferred that the external control device has the idle state judgment means, and the electric power generation control device has the electric power generation increase amount judgment means and the electric power generation amount suppressing control means, and the external control device transfers the judgment result obtained by the idle state judgment means to the electric power generation control device through a communication line. The configuration of judging the occurrence of the increase of the electric power generation amount by the electric power generation control device can reduce the processing burden or load of the external control device.

According to another aspect of the present invention, it is preferred that the electric power generation control system described above further has an external control device placed apart from the vehicle alternator, and an electric power generation control device placed near the vehicle alternator. In the electric power generation control system, it is preferred that the electric power generation control device has the idle state judgment means, the electric power generation increase amount judgment means, and the electric power generation amount suppressing control means. The configuration in which the electric power generation control device judges whether or not the vehicle engine falls in the idle operation state can further reduce the processing burden or load of the external control device.

According to another aspect of the present invention, it is preferred that the electric power generation control device in the electric power generation control system described above has a normal control means configured to control the electric power generation state of the vehicle alternator based on the electric power generation request amount for the vehicle alternator transferred from the external control device. It is further preferred that the electric power generation request amount includes at least one parameter of an adjustment voltage indication value, an exciting current indication value, and a F duty ratio instruction value for use in control of a duty ratio of a drive signal for a switching element which drives an exciting current of the vehicle alternator. Because the external control device determined the optimum electric power generation amount and transfers the determined one to the electric power generation control device, the electric power generation control device can only control the electric power generation of the vehicle alternator based on the various types of the indication values in the received electric power generation request amount. It is therefore possible to reduce the circuit configuration of the electric power generation control system because it is not necessary for the electric power generation control device to determine the electric power generation request amount. This feature can increase the reliability of the entire system, reduce the manufacturing cost of the electric power generation system, and achieve the quick response, namely, reduce the response time.

According to another aspect of the present invention, it is preferred that the normal control means in the electric power generation control system described above performs at least one of following control operations: controlling the output voltage of the vehicle alternator based on the adjustment voltage indication value, and controlling the exciting current of the vehicle alternator based on the exciting current indication value. It is thereby possible to stabilize the output voltage to be applied from the vehicle alternator to the battery and the charging current to be supplied from the vehicle alternator to the battery.

According to another aspect of the present invention, it is preferred that the normal control means in the electric power generation control system described above performs a load response control of gradually increasing a duty ratio of the drive signal based on the F duty ratio indication value when the amount of the electric loads is increased while performing at least one of the output voltage control and the exciting current control of the vehicle alternator. It is thereby possible to prevent a rapid increase of the electric power generation torque on turning on the electric loads and possible to reduce the decreasing magnitude of the engine rotation speed of the vehicle engine.

According to another aspect of the present invention, it is preferred that the electric power generation amount suppressing control means in the electric power generation control system described above performs at least one of the following controls: suppressing the output voltage of the vehicle alternator, suppressing the exciting current of the vehicle alternator; and suppressing the duty ratio of the drive signal of the switching element for driving the exciting current of the vehicle alternator. It is thereby possible to easily and certainly suppress the electric power generation of the vehicle alternator with high accuracy.

According to another aspect of the present invention, it is preferred that the electric power generation amount suppressing control means in the electric power generation control system described above gives priority execution to the control of suppressing the exciting current of the vehicle alternator. It is thereby possible to certainly perform the control of suppressing the electric power generation with high accuracy.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
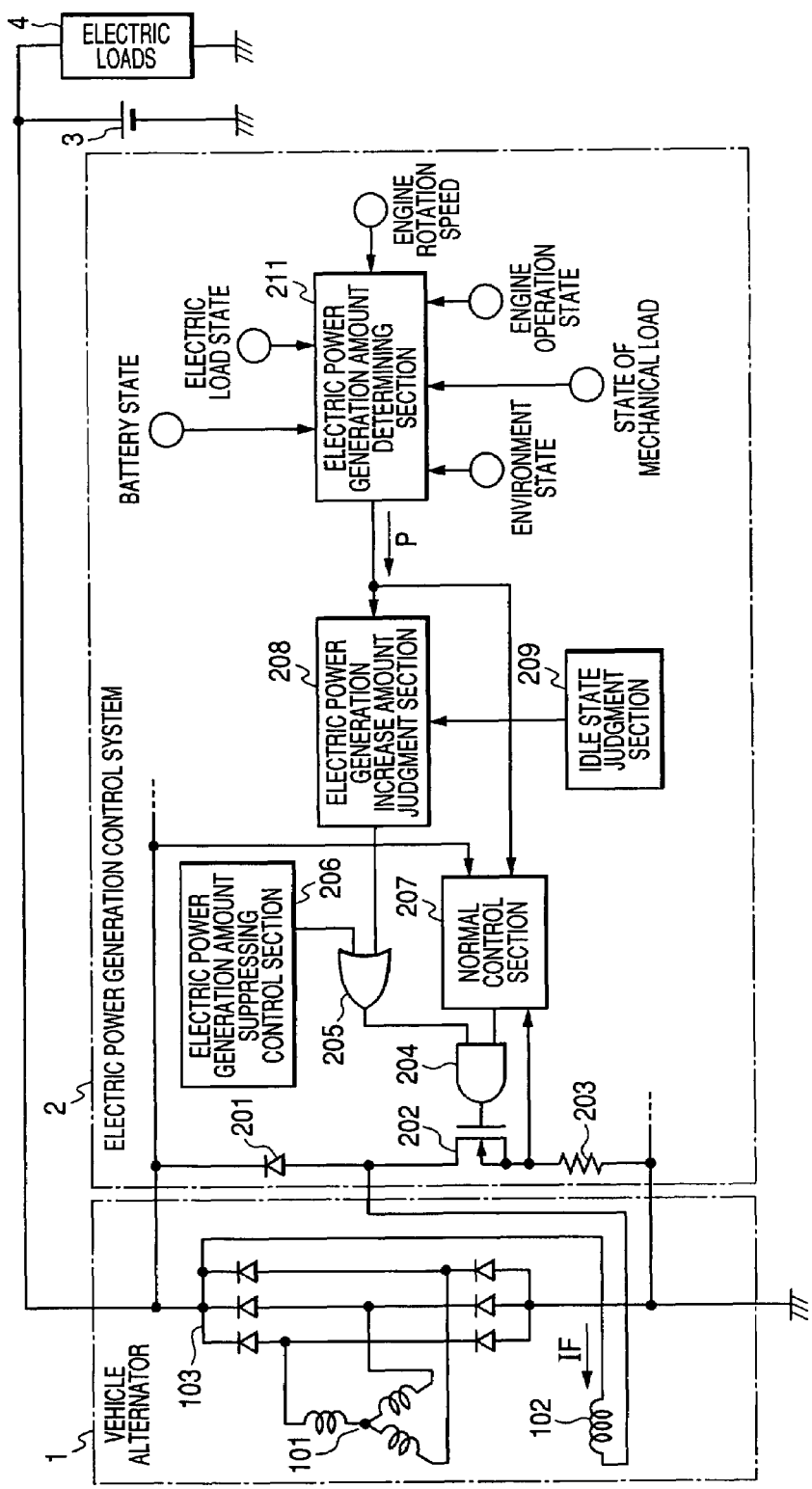
FIG. 1 is a schematic view showing an entire configuration of a vehicular electric power generation system composed of a vehicular electric power generator (or a vehicle alternator) and an electric power generation control system according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a vehicular electric power generation system composed mainly of a vehicular electric power generator and an electric power generation control system according to the first embodiment of the present invention with reference to the attached drawings.

FIG. 1 is a view showing an entire configuration of the vehicular electric power generation system composed of the vehicle alternator 1 (as a vehicular electric power generator) and the electric power generation control system 2 according to the first embodiment of the present invention.

The vehicle alternator 1 is driven by a vehicle engine (an internal combustion engine) mounted on a vehicle and supplies the electric power to a battery 3 and various types of electric loads 4. The electric power generation control system 2 controls the electric power generation of the vehicle alternator 1.

The vehicle alternator 1 is equipped mainly with a stator having a three phase stator winding 101, a rotor having an exciting winding 102, and a rectifier circuit 103 for full-wave rectifying a three phase output of the stator winding 101

In order to control the magnitude of output voltage of the vehicle alternator 1, the electric power generation control system 2 performs on-off operation of the power supply to the exciting winding 102 of the vehicle alternator 1.

The vehicle alternator 1 has output terminals which are electrically connected to the battery 3 and the various types of the electric loads 4. The vehicle alternator 1 supplies the charging current and operation current to the battery 3 and the electric load 4 through the output terminals of the vehicle alternator 1 and charging lines.

The electric power generation control system 2 is composed of an electric power generation control device placed near the vehicle alternator 1 and an engine electric control unit (or an engine ECU for short) as an outside control unit placed in position from the vehicle alternator 1.

The configuration and operation of the electric power generation control device and the engine ECU will be explained later in detail.

As schematically shown in FIG. 1, the electric power generation control system 2 is equipped with a reflux diode, a switching element 202, a sensing resistance 203, an AND circuit 204, an OR circuit 205, an electric power generation amount suppressing control section 206, a normal control section 207, a judgment section 208 for judging an increasing amount of the electric power generation, an idle state judgment section 209, and an electric power generation amount determining section 211.

The switching element 202 is electrically connected in series to the exciting winding 102 of the rotor in the vehicle alternator 1, and to which the exciting current is supplied when the switching element 202 is turned on or activated.

The reflux diode 201 is electrically connected in parallel to the exciting winding 102 of the vehicle alternator 1, and through which the exciting current flowing through the exciting winding 102 is refluxed during the turned-off state of the switching element 2.

The sensing resistance 203 is electrically connected in series to the switching element 202 composed of a power MOS FET (a MOS field effect transistor). The sensing resistance 203 detects the current flow between the source and drain of the MOS FET as the switching element 202.

The electric power generation amount suppressing control section 206 performs the control of suppressing the electric power generation amount of the vehicle alternator 1. The normal control section 207 controls the on-off state of the switching element 202 in order to reach the output voltage of the vehicle alternator 1 to a specified voltage.

The judgment section 208 judges whether the request to increase the electric power generation amount of the vehicle alternator 1 is transferred from the electric power generation amount determining section 211, namely, the request to increase the electric power generation amount of the vehicle alternator 1 is present or absence based on the electric power generation request amount P received.

The idle state judgment section 209 judges whether the vehicle engine (omitted from the drawings) is in the idle operation state (or the idle state, for short).

The electric power generation amount determining section 211 always monitors the vehicle condition and generates the electric power generation request amount P based on the various vehicle conditions and outputs the electric power generation request amount P to the judgment section 208.

The vehicle conditions to be monitored includes various states and conditions such as a battery state, an electric load state, a rotation speed of the engine, an engine operation state, a state of mechanical load, and an environment state.

Figure 2:
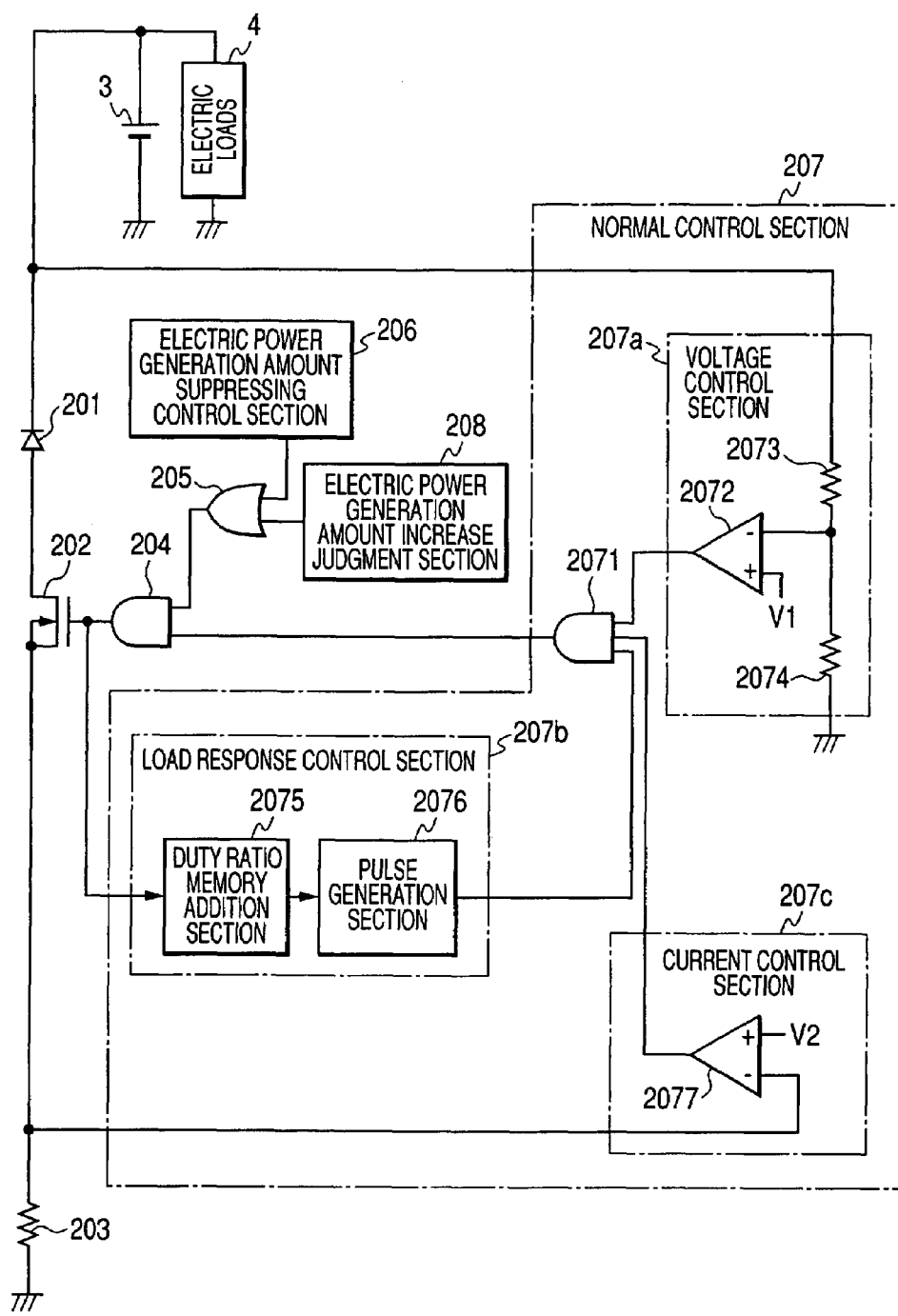
FIG. 2 is a view showing a concrete configuration of a normal control section in the electric power generation control system of the first embodiment shown in FIG. 1.

FIG. 2 is a view showing a concrete configuration of the normal control section 207 in the electric power generation control system according to the first embodiment shown in FIG. 1.

As shown in FIG. 2, the normal control section 207 is composed of a voltage control section 207a, a load response control section 207b, a current control section 207c, and an AND circuit 2071. The voltage control section 207a controls so that the output voltage of the vehicle alternator 1 maintains a specified adjustment voltage, and which is composed of a voltage comparator 2072, and resistances 2073 and 2074 connected in series. The resistances 2073 and 2074 form a voltage divider for dividing and outputting the output voltage of the vehicle alternator 1 based on a division ratio determined of resistance values of those resistances 2073 and 2074.

The voltage comparator 2072 has a positive input terminal designated by reference character "+" and a negative input terminal indicated by reference character "−". The output voltage of the voltage divider, namely the voltage at the connection node between the resistances 2073 and 2074 is input to the negative terminal of the comparator 2072. A reference voltage V1 is input to the positive terminal of the comparator 2072. This reference voltage V1 corresponds to the adjustment voltage.

The comparator 2071 outputs a low level signal when the output voltage of the vehicle alternator 1 is higher than the reference voltage V1 (as the adjustment voltage), and outputs a high level signal when the output voltage of the vehicle alternator 1 is lower than the reference voltage V1.

The load response control section 207b, composed of a duty ratio memory addition section 2075 and a pulse generation section 2076, performs slow control of slowly increasing the duty ratio of a drive signal to be input to the gate of the switching element 202 when the magnitude of the electric loads 4 is rapidly increased.

The duty ratio memory addition section 2075 stores a duty ratio of the drive signal supplied from the switching element 202, adds the stored duty ratio by a specified addition value, and outputs the added one. The pulse generation section 2076 outputs the pulse signal having the duty ratio corresponding to the output signal of the duty ratio memory addition section 2075. Accordingly, the pulse generation section 2076 outputs the pulse signal having a large duty ratio which is larger, by the specified addition value, than that of the drive signal supplied from the switching element 202.

The current control section 207c controls so that the exciting current of the vehicle alternator 1 is set to a specified value or less, which is composed of a voltage comparator 2077.

The voltage comparator 2077 has a positive input terminal designated by reference character "+" and a negative input terminal indicated by reference character "−". The voltage at one end of the sensing resistance 203 is input to the negative terminal of the comparator 2077. A reference voltage V2 is input to the positive terminal of the comparator 2077. This reference voltage V2 corresponds to the upper limit value of the exciting current.

The comparator 2077 outputs a low level signal when the exciting current exceeds the upper limit value, and outputs a high level signal when the exciting current is not less than the upper limit value.

The control section 206 configured to perform the control of suppressing the electric power generation amount of the vehicle alternator 1 basically has the same configuration of the normal control section 207. It is so set that the reference voltages V1 and V2 to be supplied to the voltage control section 207a and the current control section 207c are set to lower values in order to suppress the electric power generation of the vehicle alternator 1. Because there is no need to perform the slow control in the electric power generation amount suppressing control section 206, the duty ratio of the pulse signal output from the pulse generation section 2076 is set to a lower value.

The electric power generation amount determining section 211 corresponds to an electric power generation amount determining means, the judgment section 208 for judging the increase amount of the electric power generation of the vehicle alternator 1 corresponds to an electric power generation increase amount judgment means, the idle state judgment section 209 corresponds to an idle judgment means, the electric power generation amount suppressing control section 206 corresponds to an electric power generation amount suppressing control means, and the normal control section 207 corresponds to a normal control means.

By the way, FIG. 2 omits the electric power generation request amount P which is supplied to both of the normal control section 207 and the electric power generation increase amount judgment section 208 (see FIG. 1), for brevity.

(Operation)

A description will now be given of the operation of the vehicular electric power generation system having the configuration described above.

Figure 3:
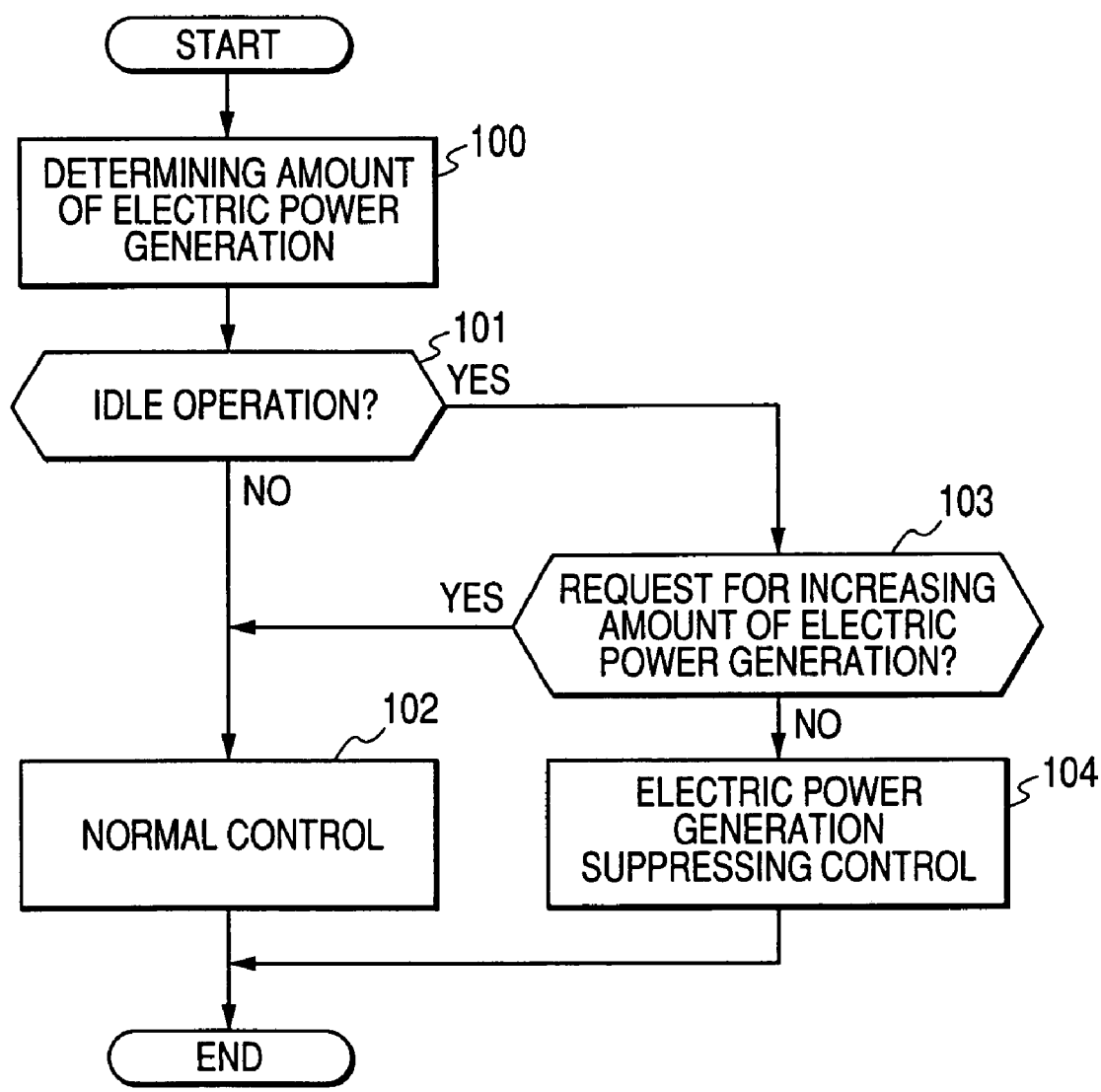
FIG. 3 is a flow chart showing the basic operation of the vehicular electric power generation system composed of the electric power generation control system according to the first embodiment shown in FIG. 1.

FIG. 3 is a flow chart showing the basic operation of the vehicular electric power generation system equipped with the electric power generation control system 2 shown in FIG. 1.

The basic operation of the vehicular electric power generation system is periodically executed. In the operation, the electric power generation amount determining section 211 monitors the various kinds of the vehicle conditions such as the battery state, the electric load state, the rotation speed of the vehicle engine, the engine operation state, the state of mechanical load, and the environment state. The electric power generation amount determining section 211 determines and outputs the electric power generation request amount P based on the vehicular conditions monitored (step S100).

The idle state judgment section 209 judges whether or not the engine falls in the idle operation (step S101). When the engine does not fall in the idle operation, the idle state judgment section 209 outputs a negative judgment and the normal control section 207 performs a normal electric power generation control (step S102) corresponding to the electric power generation request amount P (in the embodiment, the normal control means does not perform the control of suppressing the electric power generation amount).

In the configuration shown in FIG. 1, when the idle state judgment section 209 judges that the vehicle engine is not in the idle operation state, the judgment section 208 outputs a high level signal regardless of the magnitude of the electric power generation request amount P. The AND circuit 204 inputs the high level signal transferred from the judgment section 208 through one input terminal thereof through the OR circuit 205. Because the other terminal of the AND circuit 204 inputs the output signal transferred from the normal control section 207, the switching element 202 inputs the output signal transferred from the normal control section 207 through the AND circuit 204 when the engine does not fall into the idle operation state, and the normal control section 207 performs the usual electric power generation control.

When the engine falls in the idle operation state, the judgment result in step S101 takes the affirmative judgment, namely, the idle state judgment section 209 outputs the affirmative judgment result to the judgment section 208. The judgment section 208 inputs the affirmative result transferred from the idle state judgment section 209 and judges whether or not the presence of the electric power generation increase request (step S103).

Figure 4:
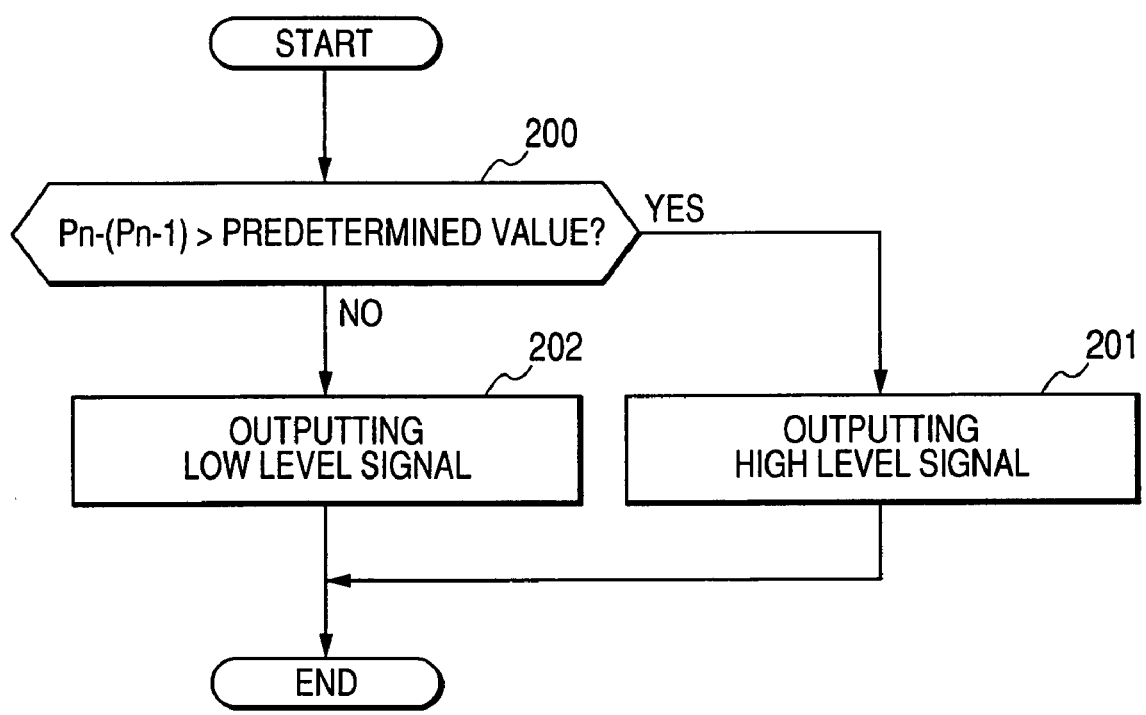
FIG. 4 is a flow chart showing the judgment operation by a judgment section capable of judging an increase amount of the electric power generation.

FIG. 4 is a flow chart showing the judgment operation of the judgment section 208 capable of judging the increasing amount of the electric power generation.

The judgment section 208 calculates a difference of the electric power generation request amounts Pn and Pn−1 at both timings, namely, at a current detection time and at a previous detection time. The judgment section 208 then judges that the calculated difference value exceeds a specified value (step S200).

When the difference value between the electric power generation request amounts Pn and Pn−1 exceeds the specified value, the judgment section 208 takes the affirmative judgment. This judgment result indicates the presence of the electric power generation increase request. The judgment means 208 thereby generates and outputs the high level signal (step S201).

On the contrary, when the difference value between the electric power generation request amounts Pn and Pn−1 does not exceeds the specified value, the judgment section 208 takes the negative judgment. Because this judgment result indicates the absence of the electric power generation increase request, the judgment means 208 generates and outputs the low level signal (step S202).

In the presence of the electric power generation amount increase request, the judgment result obtained in step S103 takes the affirmative judgment. In this situation, because the judgment section 208 outputs the high level signal, the normal control section 207 performs the control for executing the normal electric power generation (step S102).

On the contrary, in the absence of the electric power generation amount increase request, the judgment result obtained in step S103 takes the negative judgment. In this situation, because the judgment section 208 outputs the low level signal to the other input terminal of the OR circuit 205, the electric power generation amount suppressing control section 206 performs the control of suppressing the electric power generation amount (step S104).

Figure 5:
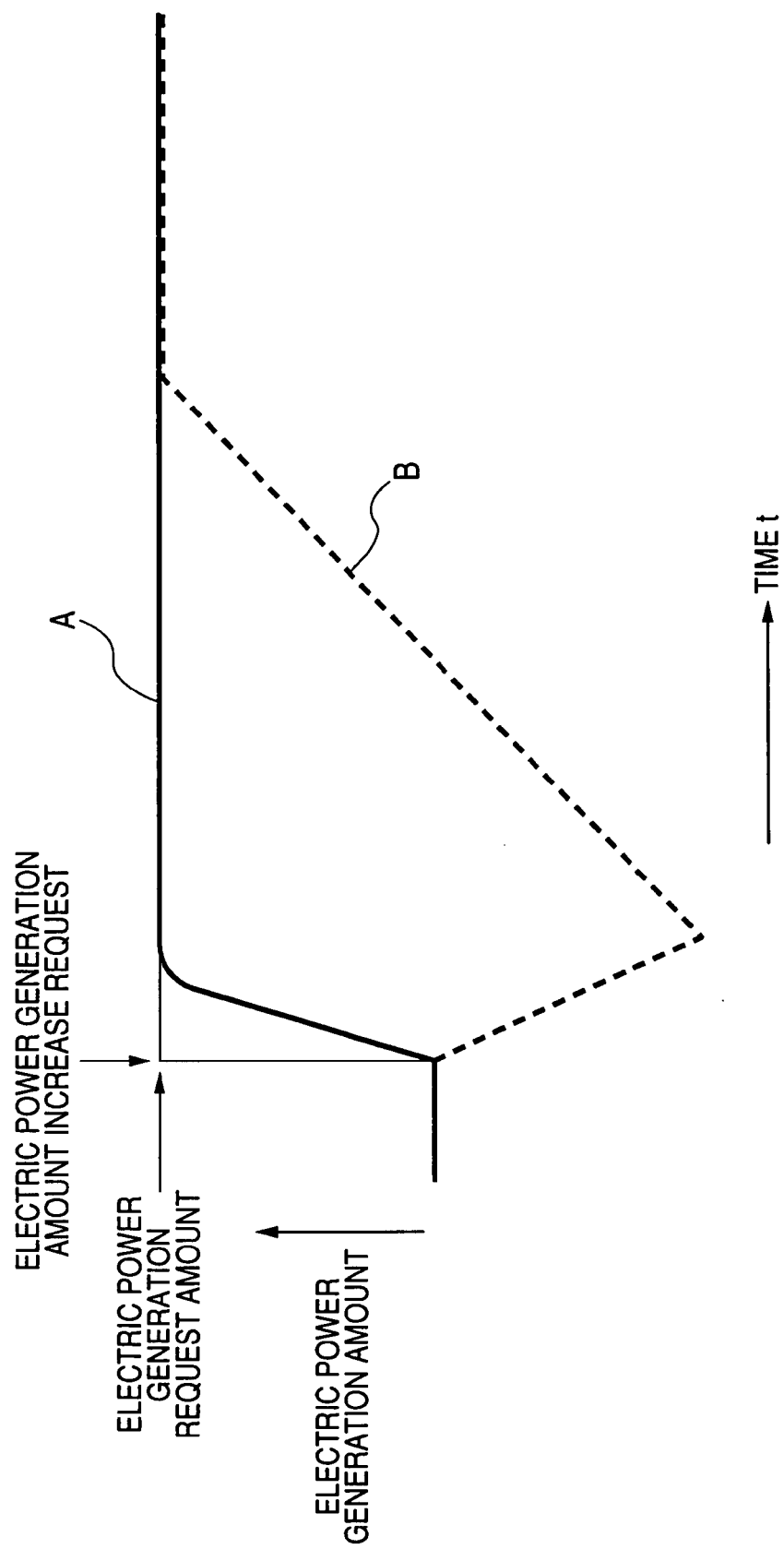
FIG. 5 is a view showing a change of the electric power generation amount under the presence of the request to increase the electric power generation amount.

FIG. 5 is a view showing a change of the electric power generation amount under the presence of the electric power generation amount increasing request. In FIG. 5, the vertical axis designates an elapsed time "t", and the horizontal axis indicates the electric power generation amount. In the vehicular electric power generation system of the first embodiment, the electric power generation suppressing control is promptly interrupted even if the vehicle engine falls in the idle operation state, and the normal electric power generation control is performed instead of the electric power generation suppressing control. Accordingly, as shown by reference character "A" in FIG. 5, the electric power generation amount increase control is performed simultaneously when the electric power generation request amount P is increased (Reference character "B" indicates the change of the electric power generation performed by a conventional manner as comparison example). It is thereby possible to prevent the rapid change of the electric power generation amount. Further, because the electric power generation amount suppressing control is performed in the absence of the electric power amount increase request during the idle operation state of the vehicle engine, it is thereby possible to stabilize the engine rotation speed by reducing the electric power torque.

When the electric power generation amount increasing request is present during the idle operation state of the engine, because the control of suppressing the electric power generation amount is interrupted and the normal electric power generation control (which does not suppress the electric power generation) is performed instead, it is possible to promptly keep the electric power generation amount to be requested and to prevent the voltage drop when the electric loads are switched (turned on). In addition, because the vehicular conditions are monitored and the electric power generation request amount is determined based on the monitored vehicular conditions, it is possible to perform a quick response to the electric power generation amount increase request.

Second Embodiment

Next, a description will now be given of the electric power generation control system composed mainly of an electric power generation control device 2A and an engine ECU 2B according to the second embodiment of the present invention.

Figure 6:
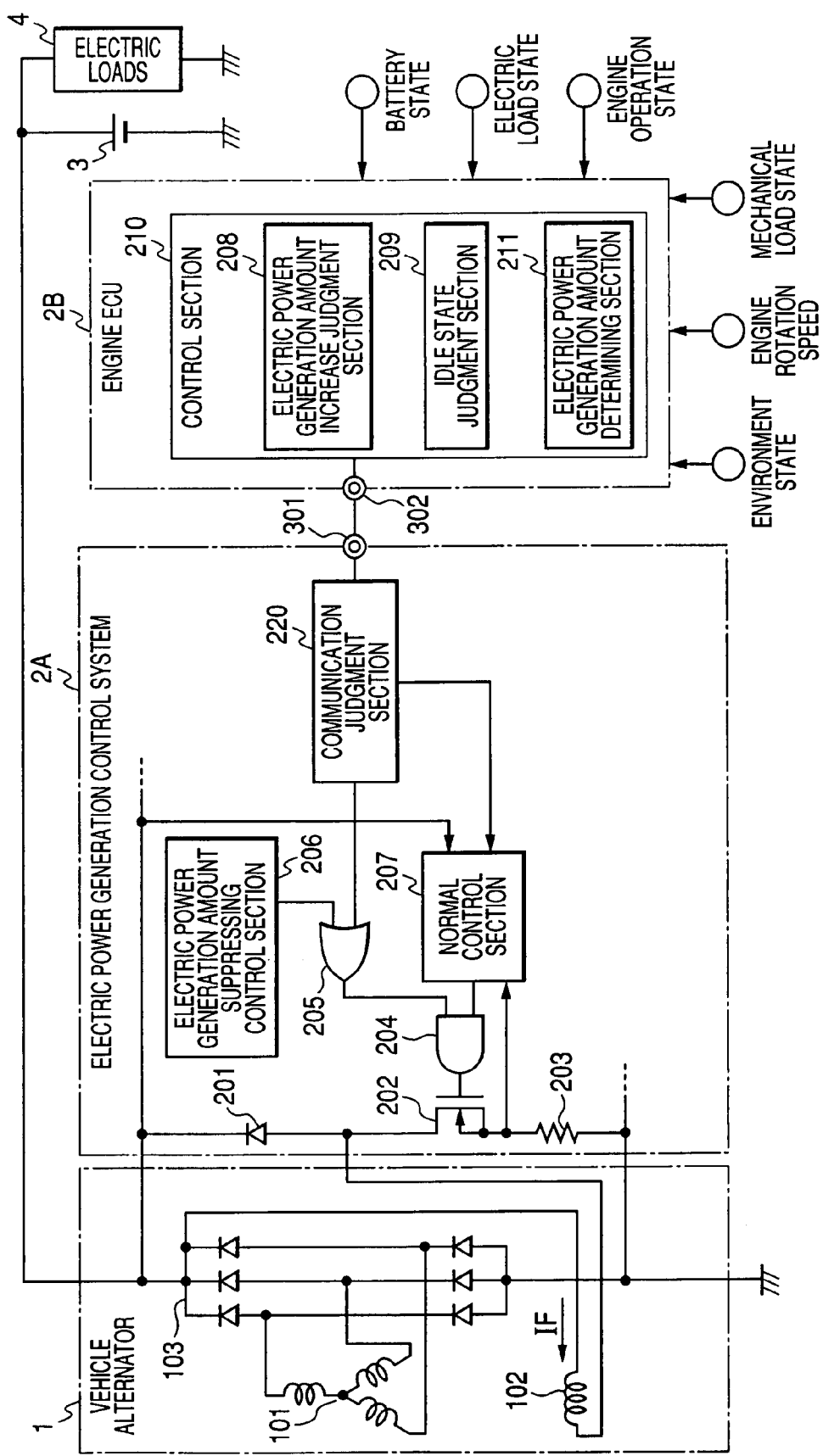
FIG. 6 is a view showing an electric power generation system composed of a vehicle alternator, an electric power generation control device, and an engine ECU according to a second embodiment of the present invention.

FIG. 6 is a view showing an electric power generation system composed of the electric power generation control system equipped mainly with the electric power generation control device 2A and the engine ECU 2B according to the second embodiment of the present invention.

The example shown in FIG. 6 takes the dispersion configuration. That is, the electric power generation control device 2A is equipped mainly with the reflux diode 201, the switching element 202, the sense resistance 203, the AND circuit 204, the OR circuit 205, the electric power generation amount suppressing control section 206, the normal control section 207, and a communication terminal 301.

The engine ECU 2B is equipped with the judgment section 208 for judging an increasing amount of the electric power generation, and the idle state judgment section 209, and the electric power generation amount determining section 211.

The engine ECU 2B is equipped mainly with the control section 210 having the judgment section 208 for judging an increasing amount of the electric power generation, the idle state judgment section 209, the electric power generation amount determining section 211, and a communication terminal 302.

The engine ECU 2B A transfers the transmission data to the electric power generation control device 2 through the communication terminals 302 and 301. The transmission date has a specified format in which the electric power generation request amount P determined by the electric power generation amount determining section 211 and the judgment result of the judgment section 208 are written or set.

Figure 7:
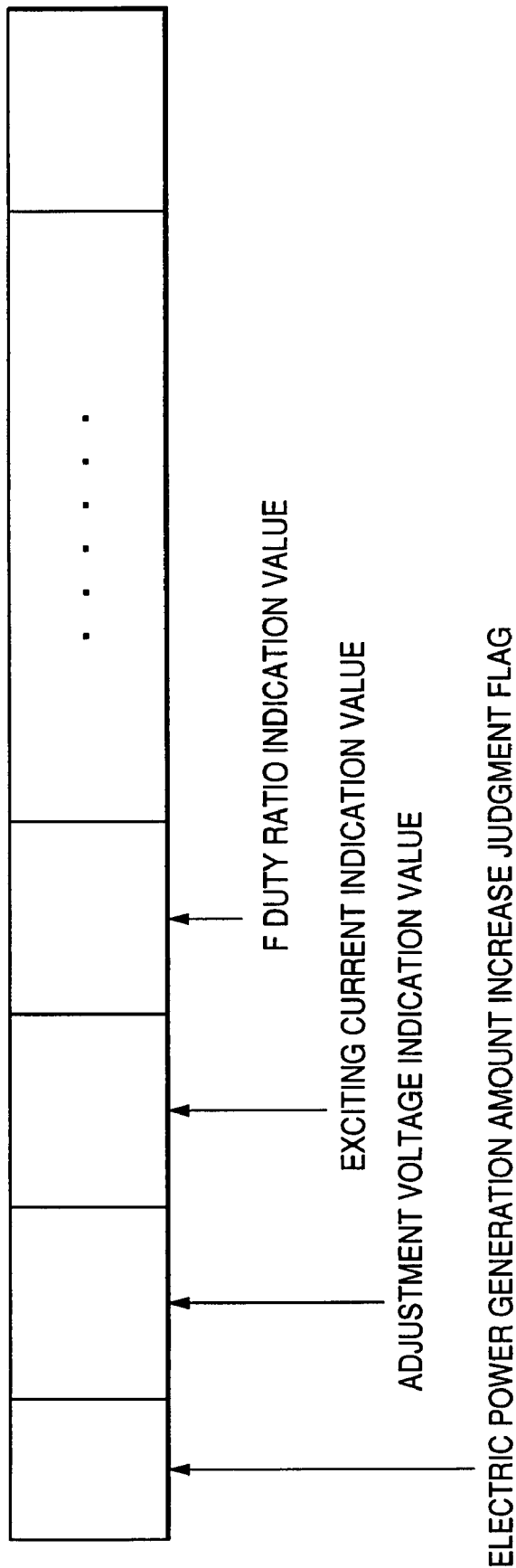
FIG. 7 is a view showing a frame format of a transmission data to be transferred from the engine ECU to the electric power generation control device.

FIG. 7 is a view showing the frame format of the transmission data to be transferred from the engine ECU 2B to the electric power generation control device 2A through the communication line connected to the communication terminals 302 and 301. The frame of the transmission data shown in FIG. 7 has an electric power generation amount increase judgment flag, an adjustment voltage indication value as the electric power generation amount request value P, an exciting current indication value, and a F duty ratio instruction value.

The electric power generation amount increase judgment flag indicates the judgment result of the judgment section 208. In the presence of the electric power generation amount increase request (the affirmative judgment in step S200 shown in FIG. 4), the value "1" is set to the electric power generation amount increase judgment flag in the transmission data shown in FIG. 7. On the contrary, In the absence of the electric power generation amount increase request (the negative judgment in step S200 shown in FIG. 4), the value "0" is set to the electric power generation amount increase judgment flag in the transmission data shown in FIG. 7. The adjustment voltage indication value, the exciting current indication value, and the F duty ratio instruction value are control parameters to be transferred to and used in the normal control section 207.

In a concrete example, the adjustment voltage indication value is used for setting the reference voltage V1 in the voltage control section 207a shown in FIG. 2. For example, the reference voltage V1 is generated by converting the adjustment voltage indication value (as digital data) to an analogue voltage through a digital to analogue conversion device (not shown). The generated reference voltage V1 is supplied to the positive terminal of the voltage comparator 2072.

The exciting current indication value is used for setting the reference voltage V2 to the current control section 207c shown in FIG. 2. For example, the reference voltage V2 is generated by converting the exciting current indication value (as digital data) to an analogue voltage through a digital to analogue conversion device (not shown). The generated reference voltage V2 is supplied to the positive input terminal of the voltage comparator 2077

The F duty ratio instruction value is used for setting the increasing amount in order to calculate the maximum value of the duty ratio or the duty ratio in the output values from the duty ratio memory addition section 2075 in the load response control section 207b shown in FIG. 2.

The electric power generation control device 2A has a communication judgment section 220 configured to receive the data transferred from the engine ECU 2B through the communication terminal 301, and then judges the content of the received data.

The communication judgment section 220 outputs the high level signal to the OR circuit 205 when the electric power generation amount increase judgment flag is the value, "1" (see the frame of the transmission data transferred from the engine ECU 2B shown in FIG. 7). The communication judgment section 220 outputs the low level signal to the OR circuit 205 when the electric power generation amount increase judgment flag is the value "0".

The communication judgment circuit 220 extracts the adjustment voltage indication value, the exciting current indication value, and the F duty ratio instruction value from the frame of the transmission data transferred from the engine ECU 2B. The communication judgment section 220 then outputs the extracted values to the normal control section 207.

As described above, because the engine ECU 2B is placed apart from the vehicle alternator 1, it is possible to place the engine ECU 2B apart from the vehicle engine on which the vehicle alternator 1 is mounted. This reduce various types of stress such as thermal energy and vibration of the engine supplied to the engine ECU 2B. Further, it is not necessary to consider any thermal resistance measure for the electric parts such as a CPU forming the engine ECU 2B, and thereby possible to reduce the manufacturing cost and to increase the reliability of the electric power generation control system.

Still further, because of performing the electric power generation control under the configuration in which the electric power generation control device 2A is placed close to the vehicle alternator 1, it is possible to avoid the voltage drop through connection lines and to prevent occurrence of noises on the connection lines. This can increase the reliability of the electric power generation control performed by the electric power generation system.

Third Embodiment

Next, a description will now be given of the electric power generation control system composed mainly of an electric power generation control device and an engine ECU according to the third embodiment of the present invention.

Figure 8:
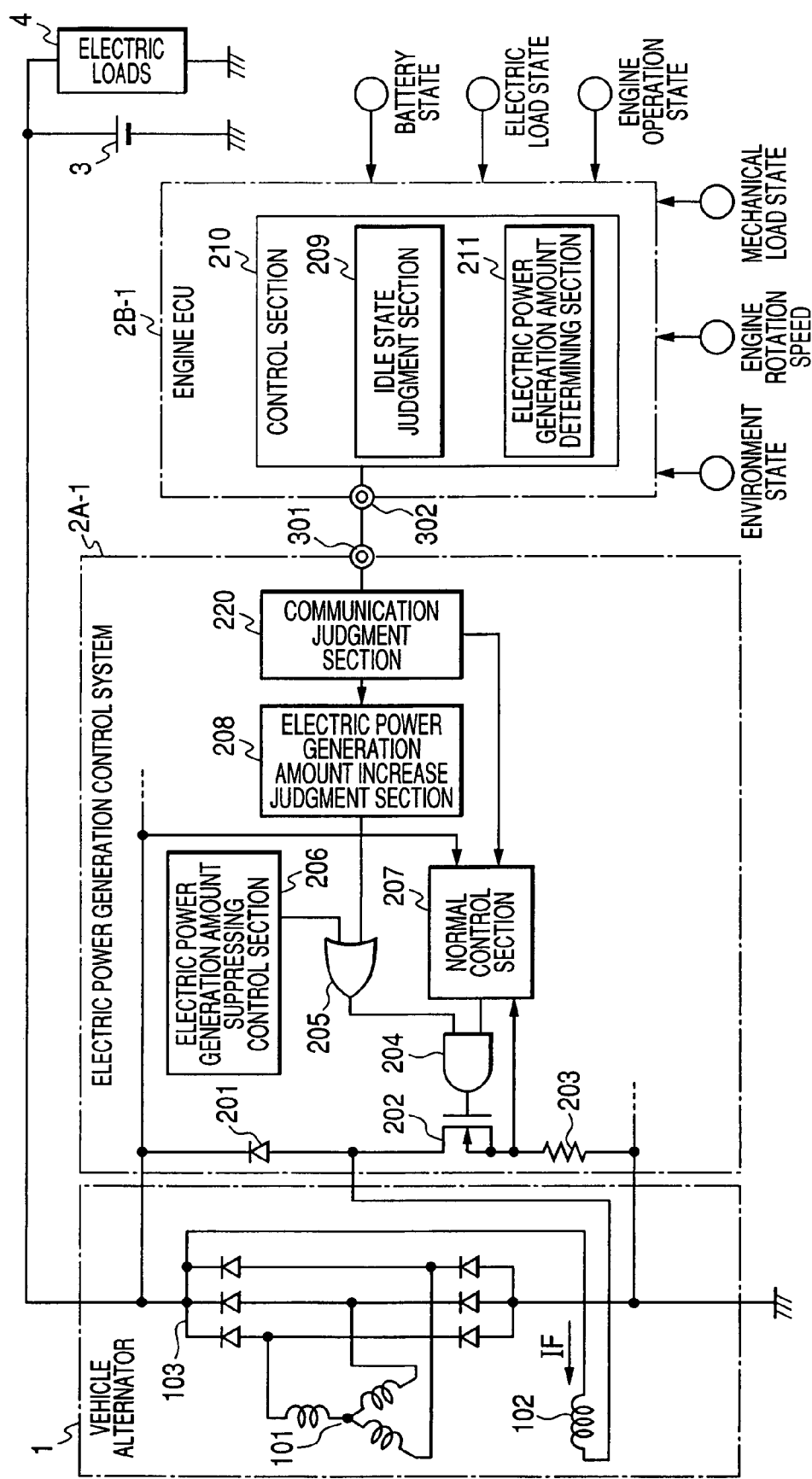
FIG. 8 is a view showing an electric power generation system composed of a vehicle alternator, an electric power generation control device, and an engine ECU according to a third embodiment of the present invention.

FIG. 8 is a view showing an electric power generation system composed of the electric power generation control system equipped mainly with the electric power generation control device 2A-1 and the engine ECU 2B-1 according to the third embodiment of the present invention.

In the configuration of the third embodiment shown in FIG. 8, the electric power generation control device 2A-1 has the reflux diode 201, the switching element 202, the sensing resistance 203, the AND circuit 204, the OR circuit 205, the electric power generation amount suppressing control section 206, the normal control section 207, the judgment section 208 for judging the increasing amount of the electric power generation, and the communication terminal 301. The engine ECU 2B-1 has the idle state judgment section 209, the electric power generation amount determining section 211, and the communication terminal 302.

The data transmission between the engine ECU 2B-1 and the electric power generation control device 2A-1 uses the transmission data having the frame shown in FIG. 7, like the configuration shown in FIG. 6. In the configuration shown in FIG. 8, because the judgment section 208 is placed in the electric power generation control device 2A-1, the frame of the transmission data has an idle state judgment flag instead of the electric power generation amount increase judgment flag in the frame shown in FIG. 7. The idle state judgment flag indicates the judgment result obtained by the idle state judgment section 209. For example, the value "1" is set to the idle state judgment flag when the vehicle engine falls in the idle operation state, and the value "0" is set to the idle state judgment flag when the vehicle engine does not fall in the idle operation state.

According to the second embodiment of the present invention described above, it is possible to reduce the processing burden or load of the engine ECU 2B-1 because the electric power generation control device 2A-1 is equipped with the judgment section 208 for judging the increasing amount for the electric power generation.

Fourth Embodiment

Next, a description will now be given of the electric power generation control system composed mainly of an electric power generation control device and an engine ECU according to the fourth embodiment of the present invention.

Figure 9:
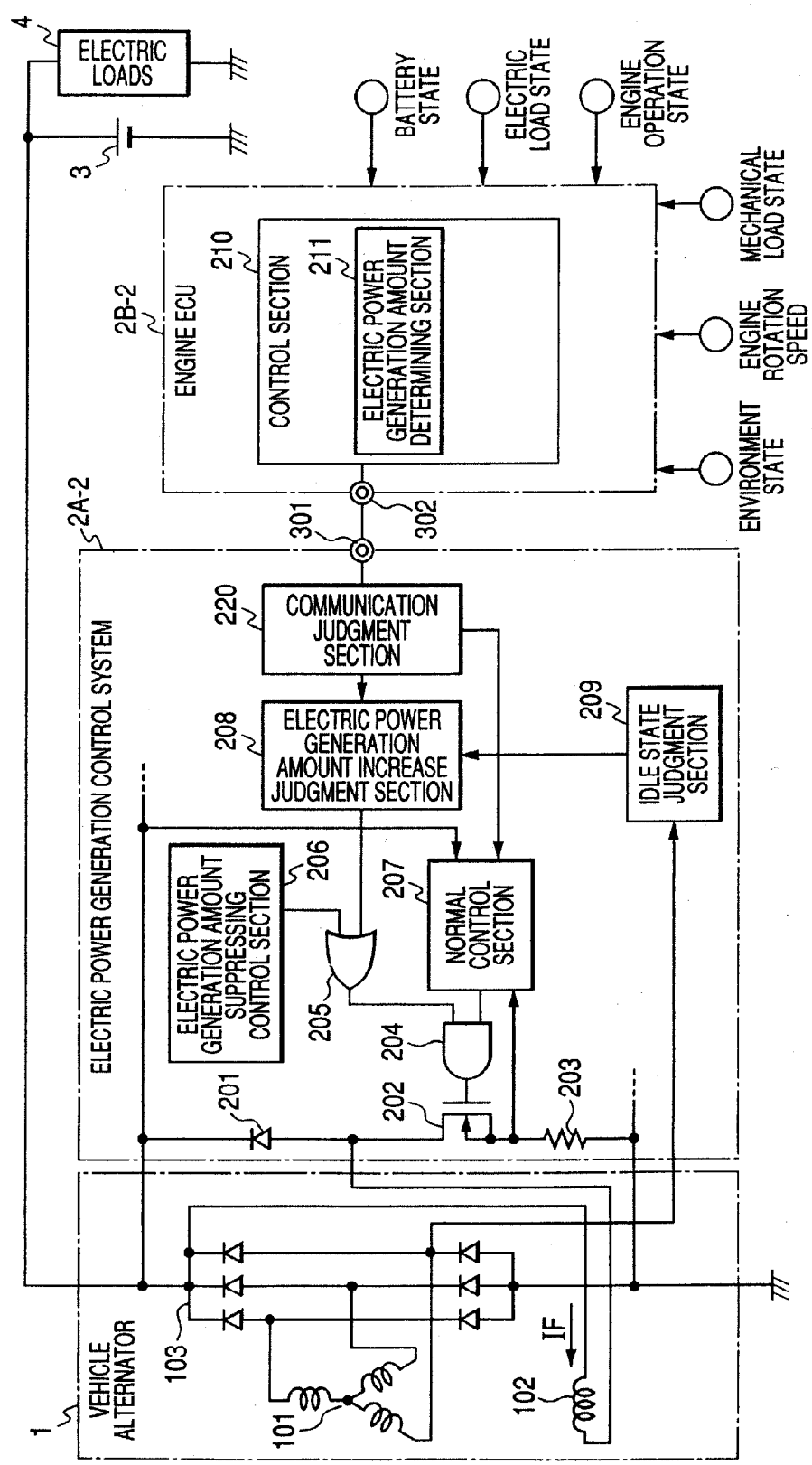
FIG. 9 is a view showing an electric power generation system composed of a vehicle alternator, an electric power generation control device, and an engine ECU according to a fourth embodiment of the present invention.

FIG. 9 is a view showing an electric power generation system composed of the electric power generation control system equipped mainly with the electric power generation control device 2A-2 and the engine ECU 2B-2 according to the fourth embodiment of the present invention.

In the configuration of the fourth embodiment shown in FIG. 9, the electric power generation control device 2A-2 is equipped with the reflux diode 201, the switching element 202, the sensing resistance 203, the AND circuit 204, the OR circuit 205, the electric power generation amount suppressing control section 206, the normal control section 207, the judgment section 208 for judging the increase amount of the electric power generation, the idle state judgment section 209, and the communication terminal 301. The engine ECU 2B-2 is equipped with the electric power generation amount determining section 211 and the communication terminal 302.

The data communication between the engine ECU 2B-2 and the electric power generation control device 2A-2 uses the frame having the configuration shown in FIG. 7, like the configuration shown in FIG. 6. In the configuration shown in FIG. 9, because the electric power generation control device 2A-2 is equipped with the judgment section 208, and the idle state judgment section 209, the electric power generation amount increase judgment flag is eliminated from the frame shown in FIG. 7, or replaced with a dummy data instead, to be transferred from the engine ECU 2B-2 to the electric power generation control device 2A-2.

Hereinafter, a description will be given of the judgment process performed by the judgment section 208. The judgment section 208 judges an increasing amount of the electric power generation in the electric power generation control devices 2A-1 and 2A-2 shown in FIG. 8 and FIG. 9.

The transmission data transferred from the engine ECU 2B-2 (see FIG. 9, or from the engine ECU 2B-1 shown in FIG. 8) includes at least the adjustment voltage indication value, the exciting current indication value, and the F duty ratio instruction value. The communication judgment section 220 in the electric power generation control device 2A-2 (or 2A-1) receives the transmission data from the engine ECU 2B-2 (or 2B-1) and transfers the data as the instruction data to the normal control section 207.

The judgment section 208 inputs the data transferred from the communication judgment section 220, compares the currently received data (N) with the previously received data (N−1). Unless the comparison result indicates that the comparison difference is increased by a specified value, the judgment section 208 judges that the electric power generation suppressing control is effective.

The operation of the electric power generation control system according to the fourth embodiment shown in FIG. 9 (or, also according to the third embodiment shown in FIG. 8) or uses the exciting current indication value instead of the electric power generation request amount P as the parameters in the judgment flow shown in FIG. 4.

Figure 10:
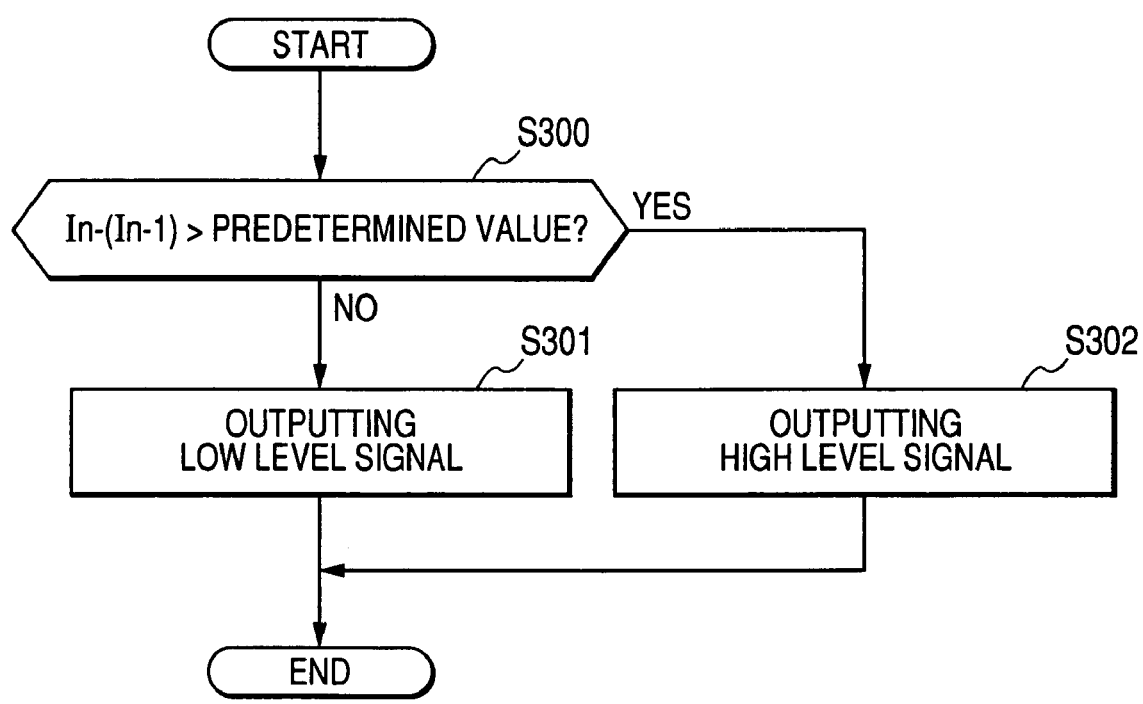
FIG. 10 is a flow chart showing the judgment operation of a judgment section for judging an increase amount of the electric power generation based on an exciting current indication value as a parameter.

FIG. 10 is a flow chart showing the judgment operation performed by the judgment section 208. The judgment section 208 judges the increase amount of the electric power generation based on the exciting current indication value as a parameter. The judgment section 208 calculates a difference between the exciting current indication value In at a current detection time and the exciting current indication value In−1 at a previous detection time, and judges that the calculated difference value exceeds a specified value (step S300).

When the difference value exceeds the specified value, the judgment section 208 takes the affirmative judgment. Because this indicates the presence of the electric power generation increase request, the judgment means 208 outputs a high level signal to the OR circuit 205 (step S301). On the contrary, when the difference value does not exceed the specified value, the judgment section 208 takes the negative judgment. Because this judgment result indicates the absence of the electric power generation increase request, the judgment means 208 outputs a low level signal to the OR circuit 205 (step S302). In the presence of the electric power generation amount increase request, the judgment result obtained in step S103 takes the affirmative judgment. In this situation, because the judgment section 208 outputs the high level signal, the normal control section 207 performs the control of executing the normal electric power generation.

When the value of approximately 0.5 A is used as the judgment value for the exciting current indication value, because the maximum exciting winding 102 becomes approximately 5 A, considering that the resistance value of an available usual exciting winding 102 takes a range of 1.5Ω to 3Ω, the increasing amount of 0.5 A becomes ten percentages of the exciting current. This is an adequate value to judge the presence of the electric power generation increase amount.

Because it is possible to judge the necessity of the electric power generation suppressing control in the electric power generation control device 2A-2 without performing a specified processing and without delay only by determining the electric power generation amount by the engine ECU 2B-2 and transferring the electric power generation amount as the indication data to the electric power generation control device 2A-2, this configuration of the fourth embodiment shown in FIG. 9 can greatly reduce the processing burden or load in the engine ECU 2B-2 and can greatly increase the responsibility regarding the necessity for the electric power generation control.

In the case that the received transmission data is the adjustment voltage indication value, it is possible to set the voltage increasing amount to a value, for example, approximate 0.3 V as the specified increasing amount, which cannot change the illumination of a light.

In the case that the received data is the F duty ratio indication value, it is possible to perform the judgment using the value which is larger than the value obtained by adding a specified addition value to the stored duty ratio value for use in the addition response control.

The idle state judgment section 209 in the electric power generation control device 2A-2 judges whether or not the engine is in the idle operation state by detecting the rotation speed of the vehicle alternator 1 based on one phase voltage in the stator winding 101.

According to the fourth embodiment, it is possible to further reduce the processing burden or load of the engine ECU 2B-2 by performing the idle state judgment, in addition to the electric power generation increase judgment, by the electric power generation control device 2A-2.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An electric power generation control system comprising:
   electric power generation amount determining means configured to determine an electric power generation request amount of a vehicle alternator while monitoring vehicle conditions;
   electric power generation increase amount judgment means configured to judge presence and absence of an electric power generation amount increase request for the vehicle alternator based on a change of the electric power generation request amount over the passage of time;
   idle state judgment means configured to judge whether or not a vehicle engine falls in idle operation state; and
   electric power generation amount suppressing control means configured to control suppression of the electric power generation amount of the vehicle alternator,
   wherein the electric power generation amount suppressing control means halts the execution of the electric power generation amount suppressing control when the judgment result of the idle state judgment means indicates that the vehicle engine falls in the idle operation state, and the judgment result of the electric power generation increase amount judgment means indicates the presence of the electric power generation amount increase request.

2. The electric power generation control system according to claim 1, wherein the electric power generation amount suppressing control means halts the control of suppressing the electric power generation amount when the judgment result of the idle state judgment means indicates that the vehicle engine does not fall in the idle operation state.

3. The electric power generation control system according to claim 1, wherein the electric power generation amount suppressing control means performs the control of suppressing the electric power generation amount when the judgment result of the idle state judgment means indicates that the vehicle engine falls in the idle operation state, and the judgment result of the electric power generation increase amount judgment means indicates the absence of the electric power generation amount increase request.

4. The electric power generation control system according to claim 1 further comprising;
   an external control device placed apart from the vehicle alternator; and
   an electric power generation control device placed near the vehicle alternator,
   wherein the external control device comprises the idle state judgment means and the electric power generation increase amount judgment means, and
   the electric power generation control device comprises the electric power generation amount suppressing control means, and
   the external control device transfers the judgment result obtained by the electric power generation increase amount judgment means to the electric power generation control device through a communication line.

5. The electric power generation control system according to claim 1 further comprising;
   an external control device placed apart from the vehicle alternator; and
   an electric power generation control device placed near the vehicle alternator,
   wherein the external control device comprises the idle state judgment means, and
   the electric power generation control device comprises the electric power generation increase amount judgment means and the electric power generation amount suppressing control means, and
   the external control device transfers the judgment result obtained by the idle state judgment means to the electric power generation control device through a communication line.

6. The electric power generation control system according to claim 1 further comprising;
   an external control device placed apart from the vehicle alternator; and
   an electric power generation control device placed near the vehicle alternator,
   wherein the electric power generation control device comprises the idle state judgment means, the electric power generation increase amount judgment means, and the electric power generation amount suppressing control means.

7. The electric power generation control system according to claim 4, wherein the electric power generation control device comprises normal control means configured to control the electric power generation state of the vehicle alternator based on the electric power generation request amount for the vehicle alternator transferred from the external control device, and
   the electric power generation request amount includes at least one parameter of an adjustment voltage indication value, an exciting current indication value, and a F duty ratio instruction value for use in control of a duty ratio of a drive signal for a switching element which drives an exciting current of the vehicle alternator.

8. The electric power generation control system according to claim 5, wherein the electric power generation control device comprises normal control means configured to control the electric power generation state of the vehicle alternator based on the electric power generation request amount for the vehicle alternator transferred from the external control device, and
   the electric power generation request amount includes at least one parameter of an adjustment voltage indication value, an exciting current indication value, and a F duty ratio instruction value for use in control of a duty ratio of a drive signal for a switching element which drives an exciting current of the vehicle alternator.

9. The electric power generation control system according to claim 6, wherein the electric power generation control device comprises normal control means configured to control the electric power generation state of the vehicle alternator based on the electric power generation request amount for the vehicle alternator transferred from the external control device, and
   the electric power generation request amount includes at least one parameter of an adjustment voltage indication value, an exciting current indication value, and a F duty ratio instruction value for use in control of a duty ratio of a drive signal for a switching element which drives an exciting current of the vehicle alternator.

10. The electric power generation control system according to claim 7, wherein the normal control means performs at least one of following control operations:
    controlling the output voltage of the vehicle alternator based on the adjustment voltage indication value; and
    controlling the exciting current of the vehicle alternator based on the exciting current indication value.

11. The electric power generation control system according to claim 10, wherein the normal control means performs a load response control of gradually increasing a duty ratio of the drive signal based on the F duty ratio indication value when the amount of the electric loads is increased while performing at least one of the output voltage control and the exciting current control of the vehicle alternator.

12. The electric power generation control system according to claim 4, wherein the electric power generation amount suppressing control means performs at least one of the following controls:

suppressing the output voltage of the vehicle alternator;
   suppressing the exciting current of the vehicle alternator; and
   suppressing the duty ratio of the drive signal of the switching element for driving the exciting current of the vehicle alternator.

13. The electric power generation control system according to claim 5, wherein the electric power generation amount suppressing control means performs at least one of the following controls:

suppressing the output voltage of the vehicle alternator;
   suppressing the exciting current of the vehicle alternator; and
   suppressing the duty ratio of the drive signal of the switching element for driving the exciting current of the vehicle alternator.

14. The electric power generation control system according to claim 6, wherein the electric power generation amount suppressing control means performs at least one of the following controls:

suppressing the output voltage of the vehicle alternator;
   suppressing the exciting current of the vehicle alternator; and
   suppressing the duty ratio of the drive signal of the switching element for driving the exciting current of the vehicle alternator.

15. The electric power generation control system according to claim 12, wherein the electric power generation amount suppressing control means gives priority execution to the control of suppressing the exciting current of the vehicle alternator.

* * * * *